United States Patent
Brown

(10) Patent No.: US 8,118,697 B2
(45) Date of Patent: *Feb. 21, 2012

(54) MECHANICAL FUNCTION CONTROL OF CONTINUOUSLY VARIABLE TRANSMISSION HYDRAULIC SYSTEM

(76) Inventor: Albert W. Brown, Newport Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/901,737

(22) Filed: Oct. 11, 2010

(65) Prior Publication Data

US 2011/0028251 A1 Feb. 3, 2011

Related U.S. Application Data

(63) Continuation of application No. 12/126,586, filed on May 23, 2008, now Pat. No. 7,811,188.

(60) Provisional application No. 60/939,808, filed on May 23, 2007.

(51) Int. Cl.
*F16H 55/56* (2006.01)
*F16H 61/06* (2006.01)

(52) U.S. Cl. .......... 474/43; 474/8; 474/18; 474/28; 474/19; 475/116; 477/45; 477/39; 701/51; 701/67

(58) Field of Classification Search .......... 474/18, 474/28, 43, 24, 17
See application file for complete search history.

(56) References Cited

U.S. PATENT DOCUMENTS

| | | | |
|---|---|---|---|
| 3,587,237 A | 6/1971 | Pierrat | |
| 3,704,634 A | 12/1972 | Schrodt | |
| 4,023,425 A | 5/1977 | Parker | |
| 4,526,557 A | 7/1985 | Tanaka | |
| 4,579,021 A | 4/1986 | Yamamuro et al. | |
| 5,046,991 A * | 9/1991 | Friedmann | 474/18 |
| 5,279,525 A | 1/1994 | Rattunde | |
| 6,682,451 B1 | 1/2004 | Luh et al. | |
| 6,712,724 B2 | 3/2004 | Katou | |
| 7,112,154 B2 | 9/2006 | Wakahara et al. | |
| 7,377,106 B2 | 5/2008 | Sakikawa et al. | |
| 7,389,640 B2 | 6/2008 | Muller et al. | |
| 2002/0160867 A1 * | 10/2002 | Katou | 474/28 |
| 2006/0222527 A1 | 10/2006 | Kurita et al. | |

OTHER PUBLICATIONS

International Search Report, Dated Sep. 3, 2008; 2 pages.

* cited by examiner

*Primary Examiner* — Robert Siconolfi
*Assistant Examiner* — San Aung
(74) *Attorney, Agent, or Firm* — Knobbe, Martens, Olson & Bear, LLP

(57) ABSTRACT

A simplified continuously variable transmission system control provides a variable clamping force and a differential cylinder pressure manipulation to change sheave ratios. The system control uses two pumps. The first pump provides the variable clamping force. The second pump provides pressure changes to effect ratio changes. The clamping force can be varied based upon operator demand on an associated engine.

15 Claims, 7 Drawing Sheets

MECHANICAL FUNCTION CONTROL OF CONTINUOUSLY VARIABLE TRANSMISSION HYDRAULIC SYSTEM

CROSS-REFERENCE TO RELATED APPLICATIONS

This application is a continuation of U.S. patent application Ser. No. 12/126,586, filed May 23, 2008, which claims the benefit under 35 U.S.C. §119(e) of U.S. Provisional Patent Application No. 60/939,808, filed on May 23, 2007, which is hereby incorporated by reference in its entirety.

BACKGROUND OF THE INVENTION

1. Field of the Invention

The present invention generally relates to simplified electronic-free continuously variable transmission (CVT) control arrangements that control pressurizing and providing variable pressure control of a hydraulic system in a belt or chain drive CVT.

2. Description of the Related Art

A typical vehicle CVT comprises two V shaped pulleys and a steel chain or belt disposed between them. The chain or belt transfers power from one pulley to the other pulley during pulley rotation. Both pulleys are capable of axial displacement of a belt track in order to change the ratio of the vehicle drive line. The pulleys usually are hydraulically actuated for ratio changing by integral hydraulic cylinders, which also supply a variable clamping force on the chain. The clamping force is modulated, depending on the torque load, to reduce the likelihood of chain slippage under high torque conditions but without applying unnecessary force that would increase the chain wear at low torque conditions.

Many CVT control systems are in existence and in use around the world that satisfy the above-described functions. These generally are computer-controlled systems that gather information from engine and driveline sensors, including the driver actuated throttle position. This information is used to control the ratio changing and chain clamping forces by selective manipulation of the hydraulic system pressures. These systems are complex and feature many components that increase the cost of manufacture.

SUMMARY OF THE INVENTION

A simplified construction capable of performing these functions is desired. The methods of pressurizing and control to be described here apply to two separate functions. The first function is for the variable system pressure control for chain clamping and other use. The second function is for the differential cylinder pressure manipulation that changes the CVT engine/drive line ratios.

In some configurations, a transmission and transmission control comprises a continuously variable transmission. The continuously variable transmission comprises a first sheave and a second sheave. A flexible member connects the second sheave to the first sheave such that rotation of the first sheave causes rotation of the second sheave. A continuously variable transmission output shaft is connected to the second sheave. A planetary transmission comprises an input shaft. The input shaft of the planetary transmission is connected for rotation with the continuously variable transmission output shaft. The planetary transmission input shaft is connected to a planetary transmission output shaft. A motor drives a first pump and a second pump. The first pump is fluidly connected to the first sheave and the second sheave. The first pump also is fluidly connected to a pressure relief valve. The pressure relief valve is connected to a flexible member lubrication conduit such that bypass flow from the pressure relief valve can be directed to the flexible member of the continuously variable transmission. The second pump is fluidly connected to a valve. The valve is selectively fluidly connected to the first sheave and the second sheave such that fluid can be supplied through the valve to the first and second sheave to effect ratio changes. The second pump comprises a pump case drain. The pump case drain is fluidly connected to the planetary transmission to supply fluid to gears of the planetary transmission.

In some configurations, a transmission and transmission control comprises a continuously variable transmission. The continuously variable transmission comprises a first sheave and a second sheave. A flexible member connects the second sheave to the first sheave such that rotation of the first sheave causes rotation of the second sheave. A continuously variable transmission output shaft is connected to the second sheave. A planetary transmission comprises an input shaft. The input shaft of the planetary transmission is connected for rotation with the continuously variable transmission output shaft. The planetary transmission input shaft is connected to a planetary transmission output shaft. A first pump supplies fluid to the first sheave and the second sheave such that the first pump creates a base clamping pressure. Means for modulating pressure according to engine demand is connected to the first pump such that increased operator demand on an engine results in higher clamping pressures being applied to the first and second sheave. A second pump is fluidly connected to a valve. The valve selectively shifts fluid to at least one of the first and second sheaves to effect ratio changes between the first and second sheaves.

BRIEF DESCRIPTION OF THE DRAWINGS

These and other features, aspects and advantages of certain embodiments of the present invention will be described with reference to drawings of those embodiments.

DETAILED DESCRIPTION OF THE PREFERRED EMBODIMENT

Figure 1:
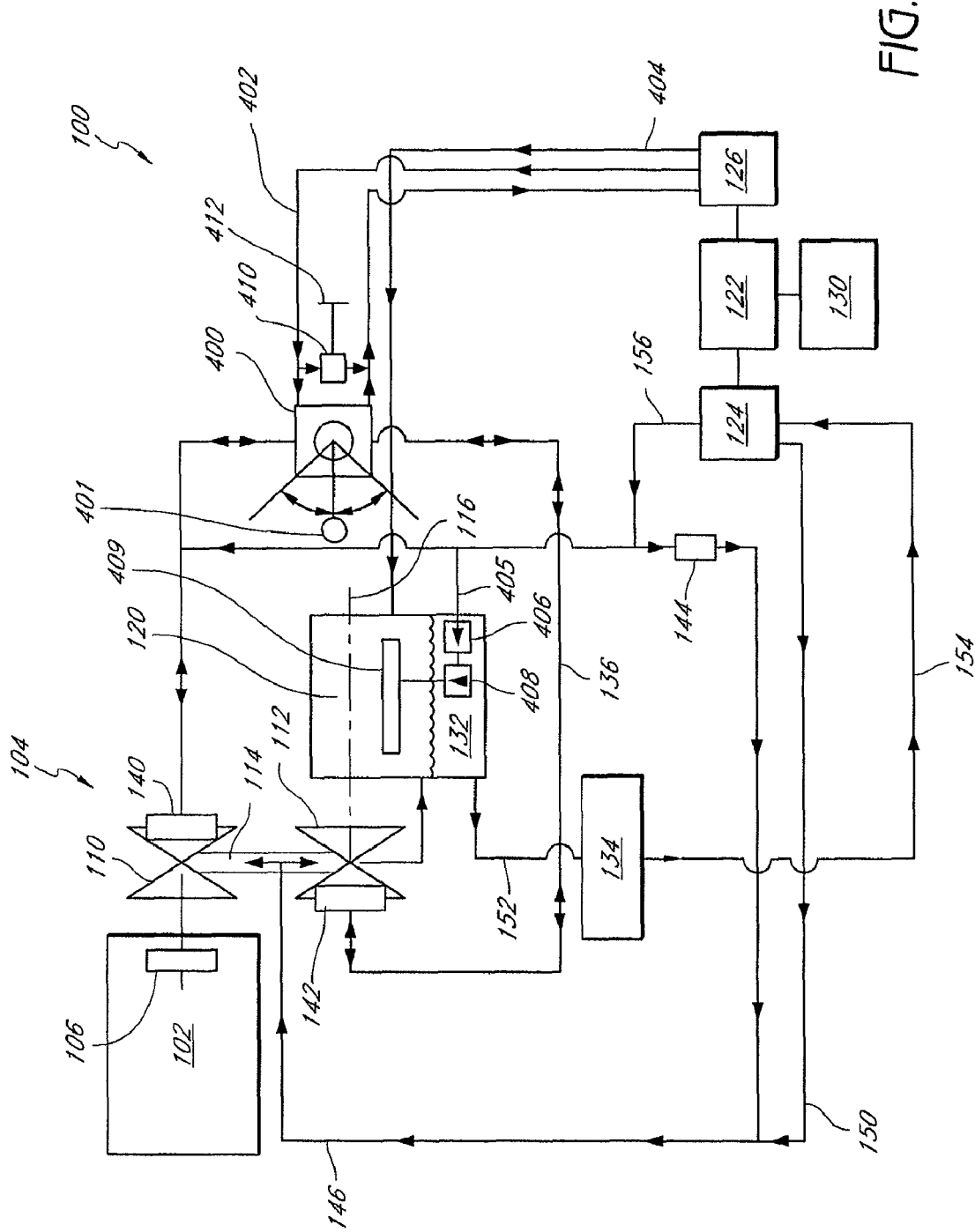
FIG. 1 is a schematic representation of a CVT system control configuration that is arranged and configured in accordance with certain features, aspects and advantages of the present invention.

FIG. 1 illustrates a CVT system control 100 is illustrated. The illustrated system control 100 provides a simplified and preferably substantially electronic free method of pressurizing and providing variable pressure control of a hydraulic system in a belt or chain drive continuously variable transmission. In the illustrated system control 100, two separate functions are controlled: chain clamping and cylinder pressure manipulation. The cylinder pressure manipulation changes CVT engine/drive line ratios when fluid passes from in either direction between cylinders.

In the illustrated configuration, an engine 102 has an output shaft that drives a continuously variable transmission (CVT) 104 through a torque converter 106. The CVT 104 comprises a primary sheave 110 and a secondary sheave 112. A flexible member 114, such as a belt or a chain, for example, connects the primary sheave 110 and the secondary sheave 112. The secondary sheave 112 preferably drives an output shaft 116 through a planetary transmission 120. The planetary transmission 120 can provide functions such as low gear, reverse gear and parking. Other configurations are possible.

The illustrated system 100 uses a single motor 122 to power components of the control system 100. The motor 122 preferably is an electric motor that drives two separate pumps 124, 126. The motor 122 also preferably receives power from a 12 volt power source 130. While the power source 130 can be a 12 volt power source, in some embodiments the power source 130 can be a 40 volt power source or some other voltage power source. Moreover, other types of motors can be used.

The two pumps 124, 126 preferably comprise the first pump 124, which controls chain clamping, and the second pump 126, which controls cylinder pressure manipulation to effect drive ratio changes. The pumps 124, 126 can be vane pumps, gear pumps, or any other suitable pump that can draw oil from a reservoir 132. Preferably, the pumps 124, 126 are positive displacement pumps.

As illustrated, the first pump 124 is driven by the motor 122. The first pump 124 draws fluid from the reservoir 132. In the illustrated configuration, the first pump 124 is connected to the reservoir 132 through a heat exchanger 134. Thus, fluid is drawn from the reservoir 132, through the heat exchanger 134 and into the first pump 124.

Fluid flowing out from the first pump 124 is supplied to a passage 136 that connects cylinders 140 of the primary sheave 110 to cylinders 142 of the secondary sheave 112. The pressurized fluid within the passage 136 establishes a base clamping force for both of the sheaves 110, 112. In order to establish and generally maintain a desired pressure within the passage 136, a pressure relief valve 144 can be fluidly connected to the passage 136.

In some embodiments, the pressure relief valve 144 is a spring-loaded relief valve. The pressure relief valve 144 can bypass excess pump flow to a lubrication passage 146. The flow through the lubrication passage 146 can be directed onto the flexible member 114 of the CVT 104.

In addition to the bypass flow from the pressure relief valve 144, internal leakage from the first pump 124 can be directed into the lubrication passage 146. For example, a case return from the first pump 124 can be connected to the lubrication passage 146 through an auxiliary passage 150. Fluid used to lubricate the flexible member 114 of the CVT 104 returns to the reservoir 132.

From the reservoir 132, the fluid is drawn through a first suction passage 152 into the heat exchanger 134. The fluid is further drawn through a second suction passage 154, which preferably fluidly connects the heat exchanger 134 to a suction port of the pump 124.

As discussed above, the pump 124 supplies fluid to the cylinders 140, 142 to provide the base clamping force. The pump 124 preferably supplies the fluid through supply line 156, which connects to the passage 136 that connects the cylinders 140 of the primary sheave 110 to the cylinders 142 of the secondary sheave 112. Desirably, the clamping force is adjustable depending upon operator demands. Thus, the pressure relief valve 144 helps to adjust the pressure within the system, whereby the clamping force can be adjusted.

Figure 2:
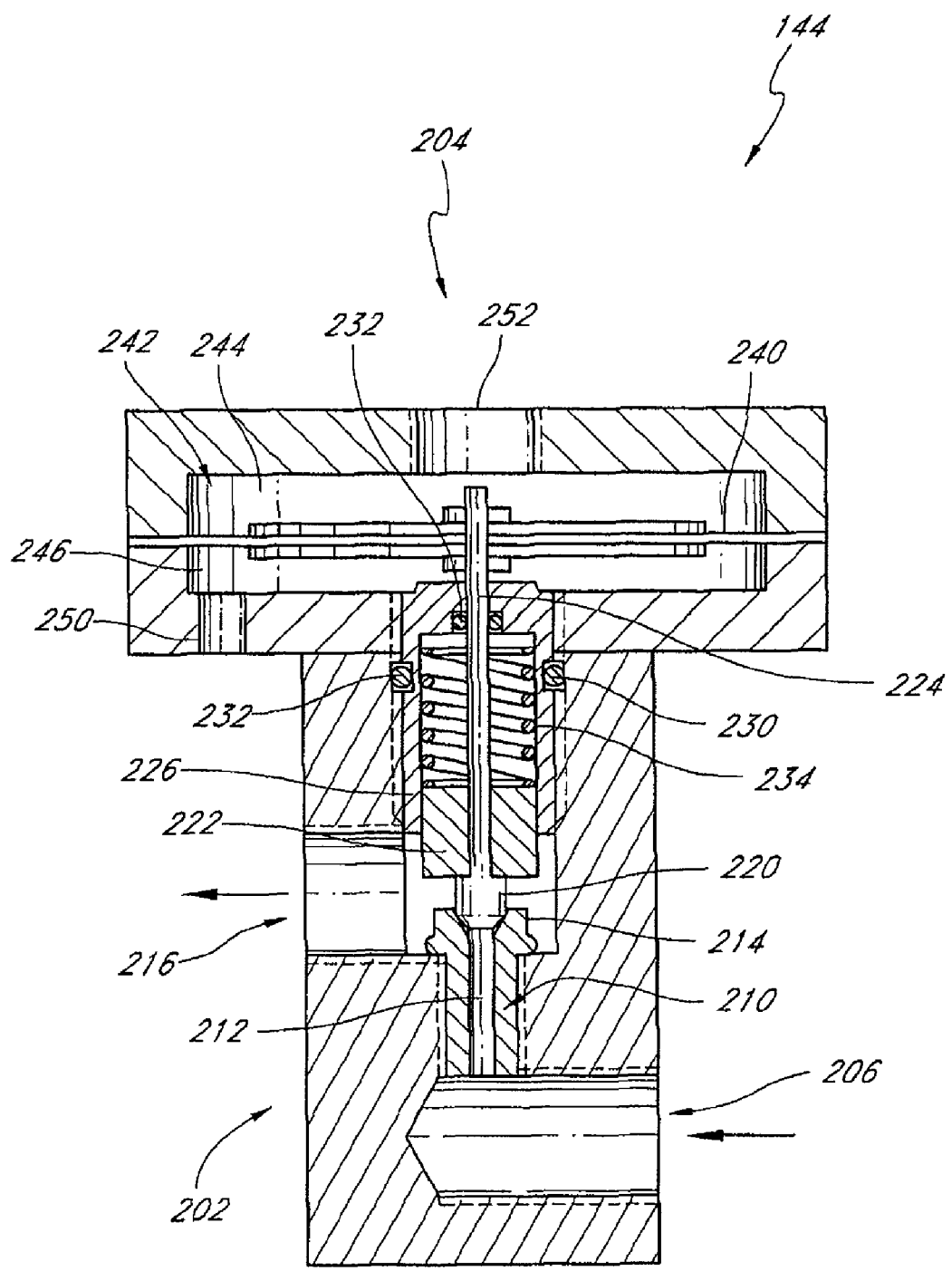
FIG. 2 is a sectioned view of a relief valve that mechanically adjusts a bypass flow to adjust clamping forces in the CVT.

FIG. 2 illustrates an embodiment of the relief valve 144. The illustrated relief valve 144 comprises a valve portion 202 and an adjustment portion 204. The adjustment portion 204 advantageously is connected (e.g., mechanically connected) to the valve portion 202 such that the adjustment portion 204 can adjust the valve portion 202 in manners that will be described.

The valve portion 202 comprises an inlet port 206. A valve body 210 is fluidly connected to the inlet port 206. The valve body 210 can be a threaded insert that can be positioned in a passage that is fluidly connected to the inlet port 206. Other configurations are possible.

The valve body 210 preferably comprises a through passage 212. An upper portion of the valve body 210 can comprise a valve seat 214. The valve seat 214 can be a tapered surface or the like. An outlet port 216 fluidly connects to the through passage 212 with the valve seat being positioned between the inlet port 206 and the outlet port 216. In some constructions, the outlet port 216 connects to the lubrication passage 146, which provides a bypass outlet.

A lower and/or outer surface of a valve member 220 can rest against the valve seat 214. In some configurations, the valve member 220 comprises an outer surface that is tapered and that can interface with the valve seat 214. In some configurations, the tapering of the outer surface of the valve member 220 is different from the tapering of the corresponding surface of the valve seat 214. The valve member 220 can affect flow between the inlet port 206 and the outlet port 216.

A bushing 222 abuts an upper end of the valve member 220 and preferably is mounted on a stem 224 of the illustrated valve member 220. The bushing 222 can provide an enlarged surface that can slide along an inner surface of a sleeve 226. The sleeve 226 can thread into a bore formed in the valve portion, for example.

In some configurations, an interface between the sleeve 226 and the surrounding body can be sealed, such as with an o-ring 230 or the like. Similarly, an interface between the sleeve 226 and the stem 224 can be sealed, such as with an o-ring 232 or the like.

A spring 234 or other suitable biasing member can be positioned between the bushing 222 and a portion of the sleeve 226, for example, such that the valve member 220 is biased toward the valve seat 214. The biasing force of the spring 234 establishes a base line pressure between the valve seat 214 and the valve member 220.

The stem 224 is connected to the adjustment portion 204. In particular, the stem 224 preferably is connected to a diaphragm member 240. The diaphragm member 240 preferably separates a chamber 242 into an intake side 244 and a vent or ambient side 246. The vent side 246 comprises one or more vent ports 250 that place the chamber 242 in fluid communication with the ambient air pressure while the intake side 244 preferably comprises one or more ports 252 such that the intake side 244 is in fluid communication with an air intake system of the associated engine.

With a spark-ignited gasoline engine, for example, the air intake manifold pressure is at high vacuum at idle and low power conditions. Under these conditions, the diaphragm member 240 exerts a strong pull force on the stem 224 to reduce the biasing force from the spring 234. Thus, the clamping force is reduced at idle because of the increased bypass flow. In other words, in the illustrated configuration, as the pressure in the intake system decreases, the stem 224 is pulled upward toward the intake side 244 of the chamber 242. Moving the stem 224 in this direction moves the valve member 220 further away from the valve seat 214, which increases the bypass flow, which in turn reduces the output pressure experienced in the passage 136 from the output of the first pump 124. Stated another way, operation of the valve member 220 can be influenced by changes in the intake manifold pressure and operation of the valve member 220 influences the output pressure experienced in the passage 236. Other configurations also are possible.

The configuration described above is a relatively simple and practical solution to controlling clamping pressures when compared to the complexities of a typical computer controlled system. The illustrated configuration is completely mechanical and automatic. The illustrated configuration requires no sensor inputs or electronics. Rather, the illustrated configuration simply uses a direct fluid connection from the chamber 242 to the intake manifold of the spark-ignited engine.

In addition to supplying clamping pressure, and in addition to lubricating the flexible member 114 through the bypass flow, the first pump 124 also can supply lubrication to pulley bearings used in the CVT 104. In some configurations, the bearings can be lubricated by providing controlled leakage that escapes at each end of shaft labyrinth seals or the like external to the tubes that supply the pulley cylinders 140, 142. Such a flow of fluid can be about 50 cc/minute maximum for each of the four bearings at the highest required clamping force and oil temperature.

Figure 3:
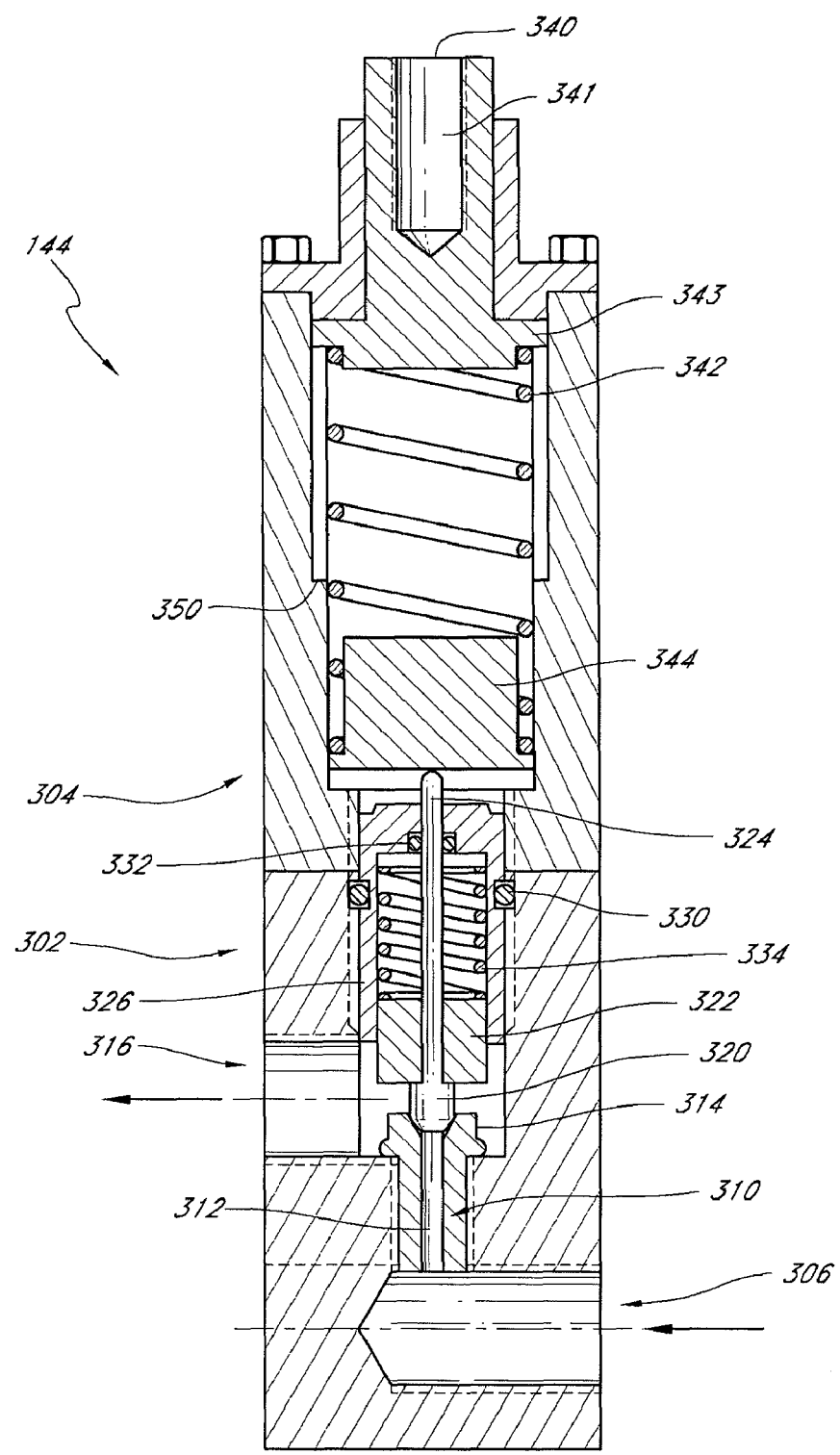
FIG. 3 is a sectioned view of another relief valve that mechanically adjusts a bypass flow to adjust clamping forces in the CVT.

With reference now to FIG. 3, another embodiment of the relief valve 144 is illustrated therein. The illustrated relief valve 144 of FIG. 3 can be used with various types of engines. In some configurations, the relief valve 144 of FIG. 3 is used with a diesel engine. In particular, diesel powered vehicles use the relief valve 144 shown in FIG. 3 because the intake manifold pressure characteristics used with the relief valve 144 shown in FIG. 2 generally are not compatible with a diesel engine.

The relief valve 144 illustrated in FIG. 3 comprises a valve portion 302 and an adjustment portion 304. The adjustment portion 304 advantageously is connected (e.g., mechanically connected) to the valve portion 302 such that the adjustment portion 304 can adjust the valve portion 302 in manners that will be described.

The valve portion 302 comprises an inlet port 306. A valve body 310 is fluidly connected to the inlet port 306. The valve body 310 can be a threaded insert that can be positioned in a passage that is fluidly connected to the inlet port 306. Other configurations are possible.

The valve body 310 preferably comprises a through passage 312. An upper portion of the illustrated valve body 310 can comprise a valve seat 314. The valve seat 314 can be a tapered surface or the like. An outlet port 316 fluidly connects to the through passage 312. In some constructions, the outlet port 316 connects to the lubrication passage 146, which provides a bypass outlet.

A lower and/or outer surface of a valve member 320 can rest against the valve seat 314. In some configurations, the valve member 320 comprises an outer surface that is tapered and that can interface with the valve seat 314. In some configurations, the tapering of the outer surface of the valve member 320 is different from the tapering of the corresponding surface of the valve seat 314. The valve member 320 and the valve seat 314 can alter flow through the pressure relief valve 144.

A bushing 322 abuts an upper end of the valve member 320 and preferably is mounted on a stem 324 of the illustrated valve member 320. The bushing 322 can provide an enlarged surface that can slide along an inner surface of a sleeve 326. The sleeve 326 can thread into a bore formed in the valve portion, for example.

In some configurations, an interface between the sleeve 326 and the surrounding body can be sealed, such as with an o-ring 330 or the like. Similarly, an interface between the sleeve 326 and the stem 324 can be sealed, such as with an o-ring 332 or the like.

A spring 334 or other suitable biasing member can be positioned between the bushing 322 and a portion of the sleeve 326, for example, such that the valve member 320 is biased toward the valve seat 314. The biasing force of the spring 334 establishes a base pressure between the valve seat 314 and the valve member 320.

The stem 324 is connected to the adjustment portion 304. In particular, the stem 324 preferably is connected to an input member 340. The input member 340 can comprise a push rod in some embodiments. The illustrated input member 340 comprises a threaded hole 341 and a flange 343. The flange can comprise a stepped lower surface in some embodiments.

The input member 340 preferably is connected to the throttle linkage or the foot pedal, for example. More preferably, the input member 340 is operatively associated with the throttle linkage, the foot pedal, both the throttle linkage and the foot pedal or some component that operates under the influence of the foot pedal or the throttle linkage. In some configurations, a remotely operated component can be used while other configurations use a direct coupling. The threaded hole 341 in the illustrated construction provides a connection to the foot pedal.

In any event, the input member 340 preferably is positioned at least partially within the adjustment portion 304. The stepped flange 343 of the illustrated input member 340 bears against a spring 342 or other biasing member. The stepped portion of the flange 343 can help keep the spring 342 properly positioned. The spring 342 also bears against an insert 344 such that the spring 342 pushes the input member 340 and the insert 344 away from each other but allows the movement (e.g., downward movement) of the input member 340 to cause movement (e.g., downward movement) of the insert 344. The insert 344 bears against the stem 324 in the illustrated configuration.

Thus, movement of the input member 340 in a downward direction causes compression of the spring 342, which causes the insert 344 to move downward against the stem 324. The movement of the insert 344 in turn causes movement of the stem 324, which increases the force applied to the valve member 320 in a closing direction. In other words, in some configurations, operation of the foot throttle starts the compression of the spring 342, which in turn applies more force through the stem 324, hence increasing the output bypass pressure of the pump, which thereby raises the clamping force on the CVT sheaves. The motions described above progressively increase the force up to the full throttle position. At the full throttle position, which results in the maximum chain clamping force, the input member 340 reaches a stop 350 to reduce the likelihood of the clamping force exceeding a predetermined limit.

While the configuration shown in FIG. 3 has been described in the context of a diesel engine, the configuration also can be used with a gasoline spark-ignition engine, electric motor or other suitable motive force components.

With reference again to FIG. 1, the second pump 126 is used to control ratio changes in the illustrated CVT 104. As shown, output from the pump 126 is supplied to a valve 400 through a supply line 402. In some configurations, the valve 400 can be a four-way open center valve (see FIG. 4). Other configurations are possible.

Figure 4:
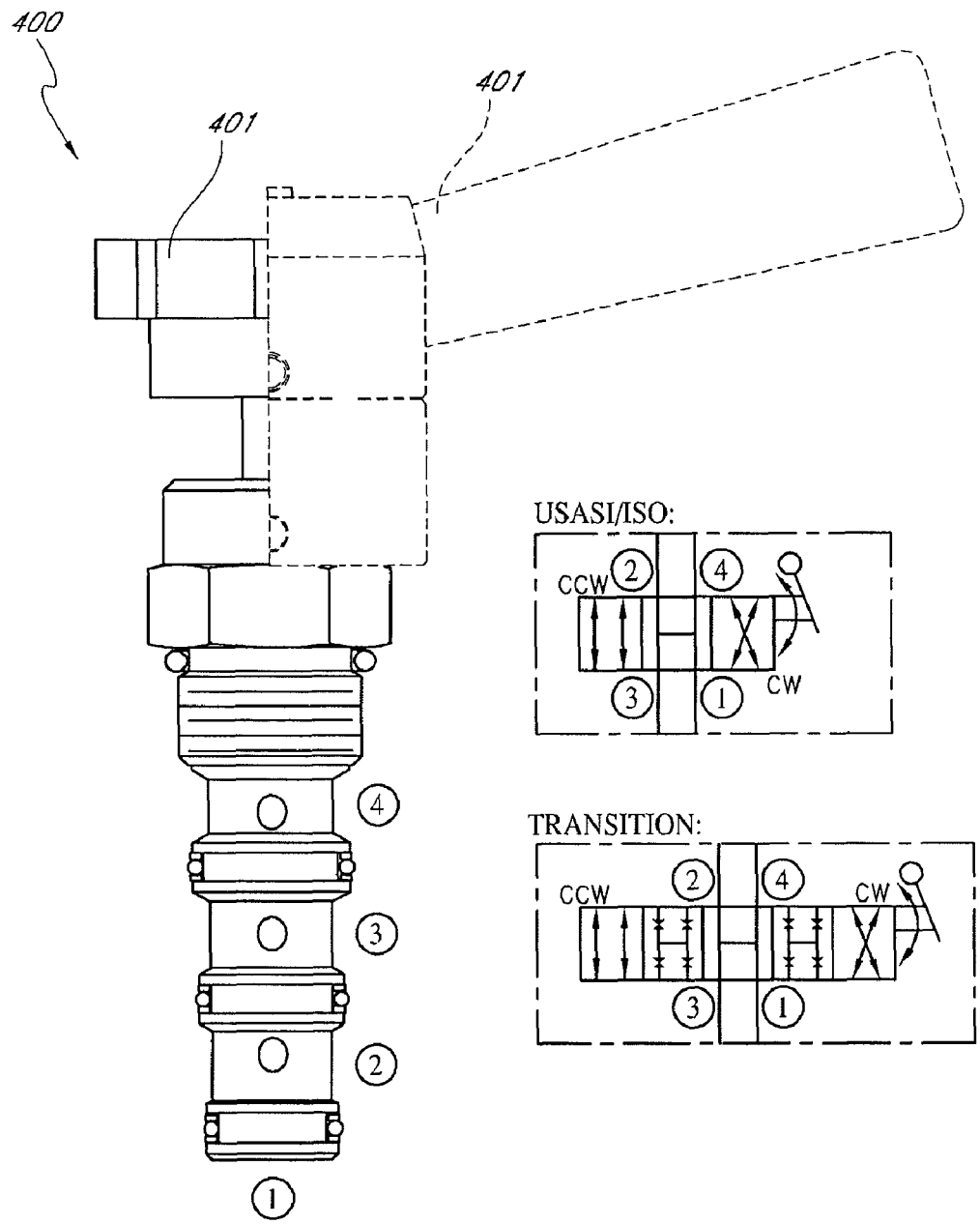
FIG. 4 is an illustration of a four-way valve used in the control configuration of FIG. 1.

The valve 400 connects to the passage 136, which preferably is a high-pressure line, that connects the cylinders 140, 142 by means of the two cylinder ports identified as 1 and 3 on FIG. 4. Preferably, the second pump 126 operates constantly. Flow through the valve 400 can be bi-directional by manipulation of the valve operating lever 401 in a clockwise or counterclockwise motion, which produces cylinder to cylinder 140-142 flow resulting in sheave travel and, hence, ratio change. When the valve operating lever 401 is in the center position, as shown in FIG. 1, all of the four ports are open to each other for interflow (i.e., the open center definition). In this position, the pump 126 simply recirculates its full flow back to the pump inlet through ports 4 and 2 in FIG. 4 and creates no differential pressure between the CVT cylinders 140-142 in the passage 136, which is always under high pressure from the clamping pump 124, and pressurizes the passages to both ports of the pump 126. Preferably, pump internal leakage is routed through a planetary hydraulic supply line 405 from a case drain port to the planetary unit 120 for gear lubrication.

Since the pressure used to actuate the planetary functions is lower (e.g., about 200 psi) than the pressure used for CVT clamping forces (e.g., up to about 600 psi), a pressure reduction valve 406 can be inserted in the planetary hydraulic supply line 405 to reduce the likelihood of overpressurization. In some configurations, a hydraulic accumulator 408 is positioned between the pressure reduction valve 406 and the planetary unit 120 to accommodate an increased demand in hydraulic flow such as might be encountered in a shift sequence. Such configurations reduce the likelihood of momentary drops in CVT line pressure. In some configurations, the fluid from the hydraulic accumulator 408 passes to a shift selection valve 409. In some configurations, it may be desirable to provide a flow restrictor (not shown) between the accumulator and the planetary unit to reduce the likelihood of excessive speeds during the shift process.

When used with a CVT that does not incorporate centrifugal pressure compensation, the pressures in the cylinders 140, 142 are only naturally balanced when the sheaves 110, 112 are operating at near the same speed, or at a one to one ratio. The greatest imbalance is at the ratio extremes. For example, in the highest ratio (low gear), the primary cylinder 140 generates an increased internal pressure because of its higher speed than the secondary cylinder 142 because of the centrifugal force and visa-versa at the lowest ratio. This imbalance during an initial acceleration increases with sheave speed and can initiate a premature ratio change. To adjust to such a ratio change, the driver can move the lever 401 to the high ratio position (i.e., low gear) to create a higher observed pressure to the secondary cylinder 142. Once the engine speed reaches a desired level, the driver can allow a ratio change to start by reducing the bias through the lever 401 until a rate change is observed. By manipulation of the lever 401, the driver can control the rate change until overdrive is reached with the lever 401 in the low ratio position (i.e., high gear) or anywhere in between as desired. Such manipulation is similar to the use of a stick shift.

With the lever 401 in a maximum stroke in either direction (i.e., low gear position or high gear position), the cylinders 140, 142 will reach full stroke. With the cylinders 140, 142 at full stroke, cylinder to cylinder flow will substantially cease, which causes a hydraulic lock and can stall the pump 126 and the motor 122. Accordingly, a bypass relief valve 410 can be inserted to recirculate flow back to the pump 126 when a preset differential high pressure is reached. In some configurations, the bypass relief valve 410 is a 100 psi relief valve. The preset differential high pressure preferably is enough to hold the CVT 104 in the overdrive range while the vehicle operates in a cruise mode.

In some configurations, a manually operated control knob 412 can be provided to the bypass relief valve 410. The control knob (or handle) 412 can be used to adjust the bypass pressure differential such that shifting of the CVT 104 can be more finely adjusted, such as through a vernier (i.e., a more precise manner of adjusting the ratio than simply using the four way valve lever only).

Under normal acceleration of the associated vehicle, the four way valve handle 401 initially can be set in the low range position. As the speed increases, the driver can incrementally rotate the handle 401 to cause the ratio to change and eventually reach the high range or overdrive position. At this point, cylinder to cylinder flow will cease and the bypass relief valve 410 will recirculate the pump flow back to the pump 126. The pressure setting of the bypass relief valve 410 preferably is enough to hold the CVT ratio in a high range during normal cruise mode.

When passing or hill climbing, as well as other situations that the ratio is changed into a lower range by a small amount and with more precise control than can be achieved by the handle 401 of the four way valve 400, the four way valve handle 401 is left in the high range position but the differential pressure between the cylinders can be reduced with the control knob 412 of the bypass relief valve 410. The setting of the bypass relief valve 410 can be used to initiate a change and then can set the pressure to hold the desired ratio. The knob 412 of the bypass relief valve 410 can be returned to its highest pressure setting upon resumption of cruise mode.

In some applications, an instrument control panel (not shown) can show a road speed, an engine speed, CVT cylinder pressures and a sensed CVT ratio, for example. Such data can be used to help a driver efficiently control the CVT 104. Other configurations are possible. In some applications, the CVT ratio can be sensed with the use of potentiometers and volt meters, or the like.

In addition to the simplified control systems described above, some aspects of the present invention result in a modular construction that simplifies manufacturing and maintenance in the field. Moreover, by virtually removing all electronics from the device, no sophisticated diagnostic equipment is needed for trouble shooting. As noted above, in some configurations, a single 12 volt direct current motor drives a pump at each end. In some embodiments, the high pressure line from the pump is connected to the primary sheave leg of the cylinder pressurizing line to assure substantially full clamping pressure at the primary sheave at all times. Further, separate cooling and lube pumps are not needed while positive, separate lubrication can be provided to both the CVT flexible member and the planetary gear set.

While the arrangement described above is manually operated and generally does not require sensors and supporting electronics, it is possible that the basic system, as described above, need not be only manually operated. The manually operated handle 401 of the four way valve 400, for example, can be replaced by an actuator, such as a stepper motor, for example but without limitation. The stepper motor can automate the shift function for the CVT 104. In other words, the actuator can automatically manipulate the four way valve 400.

In some configurations, signal inputs can be obtained that represent an engine output speed (i.e., the speed of the transmission input shaft), a speed of the transmission output shaft 116, a CVT ratio position and a throttle position. These signals can be obtained from any suitable sensors. The signals can be provided to an electronic motion controller that integrates and processes the signals in accordance with suitable programming. The output of the motion controller then is connected to an electronic step motor drive that controls the positioning of the step motor and the hydraulic four way valve. In some configurations: the step motor is part number HT17-075, available from Applied Motion Products; the step motor drive is part number 1240i, also available from Applied Motion Products; the motion controller is part number P192, available from Trio Motion Technology; the input shaft speed sensor and the output shaft speed sensor are part number MP37TA, available from Red Lion; the ratio indicator is part number Linear Potentiometer 520173, available from ELAP; and the throttle position sensor is part number 657-0-0-502, available from Vishay Potentiometer.

In some configurations, the shaft speed sensors are magnetic pulse generators that can be located at shaft ends of the CVT. Such generators produce electric pulses 16 times per revolution. The linear transducer preferably follows the position of the moving primary sheave half and changes resistance as the drive ratio changes. Finally, the throttle position sensor can be directly connected to the throttle and can change resistance as the pedal moves. Other configurations also are possible.

Figure 5:
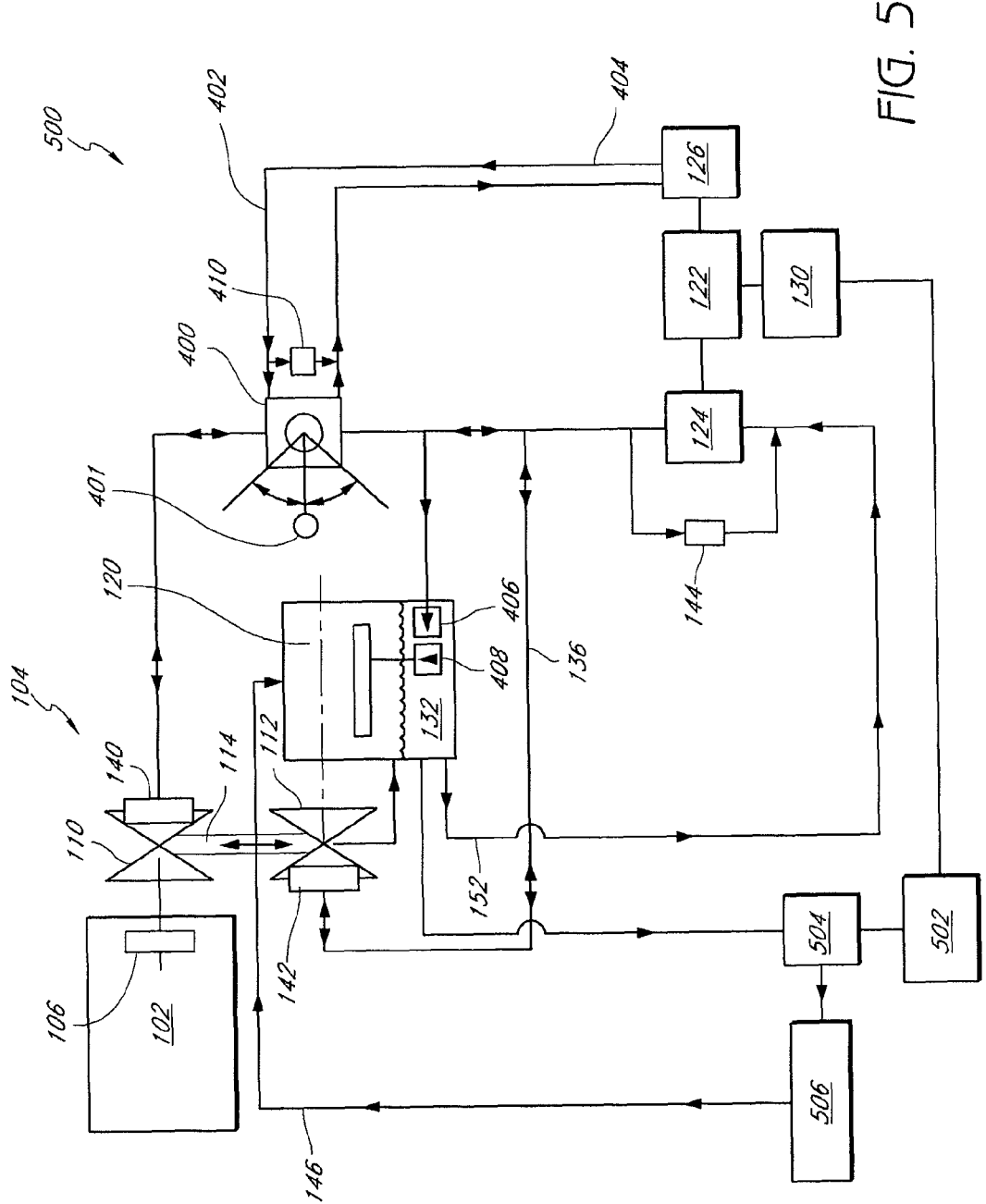
FIG. 5 is a schematic representation of a CVT system control configuration that is arranged and configured in accordance with certain features, aspects and advantages of the present invention.

FIG. 5 illustrates another CVT system control 500 that is arranged and configured in accordance with certain features, aspects and advantages of the present invention. As with the CVT system control 100 described above and shown in FIG. 1, the CVT system control 500 provides a simplified and preferably substantially electronic free method of pressurizing and providing variable pressure control of a hydraulic system in a belt or chain drive continuously variable transmission. In the illustrated system control 500, two separate functions are controlled: chain clamping and cylinder pressure manipulation. The cylinder pressure manipulation changes CVT engine/drive line ratios when fluid passes from in either direction between cylinders. Rather than fully describe the components that remain generally the same between the CVT system control 100 of FIG. 1 and the CVT system control 500 of FIG. 5, the main differences will be described.

As illustrated in FIG. 5, the CVT system control 500 preferably has a separate module that supplies lubricant to the flexible transmitter 114 and the planetary transmission 120. The illustrated module comprises a motor 502. The motor 502 receives power from the power source 130, which was described above. Other configurations are possible.

The motor 502 drives a pump 504. The pump 504 can be any suitable pump, including those described above with respect to the pumps 124, 126. The pump 504 draws fluid from the reservoir 132. From the reservoir 132, the pump 504 feeds the fluid through a heat exchanger 506. From the heat exchanger 506, the fluid is used to lubricate the flexible transmitter 114 and is supplied to the planetary transmission 120 to lubricate the moving components of the planetary transmission 120. Thus, the cooling circuit can be split between the CVT chain and the planetary mechanism. This system preferably only operates at about 10 psi.

Thus, the construction of FIG. 5 differs from the construction of FIG. 1 primarily in the provision of a separate lubricant pump and motor (see FIG. 5) rather than using bypass flow and case drain flow to provide the desired lubrication (see FIG. 1). Given this primary difference, two other changes also can be found between FIG. 5 and FIG. 1. Namely, the pressure modulating relief valve 144 recirculates back to the first pump 124 without bypassing a flow for lubrication purposes and the second pump 126 does not use the case drain to lubricate the gears of the planetary transmission. Otherwise, the construction of FIG. 5 is largely the same as the construction illustrated in FIG. 1.

Figure 6:
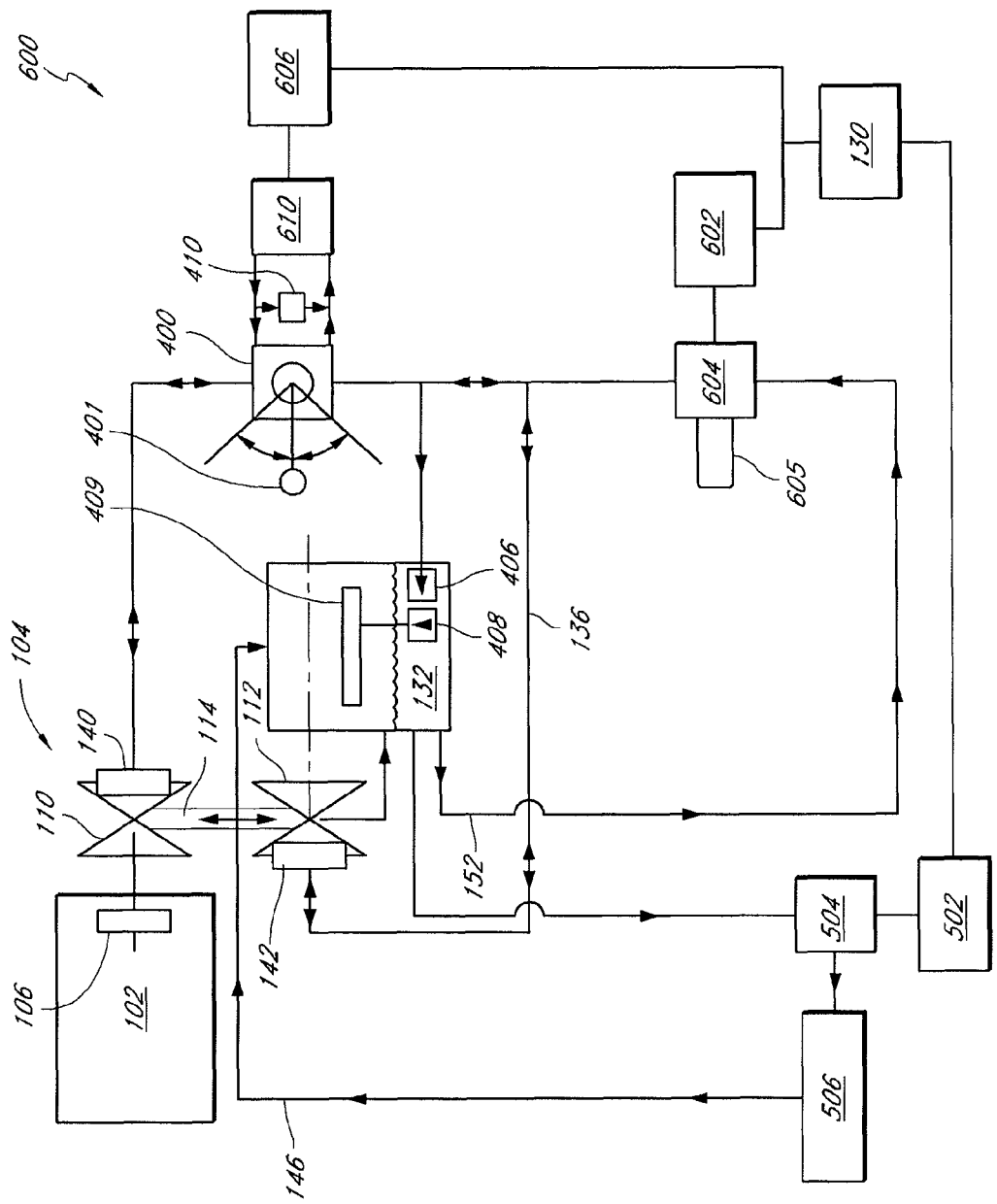
FIG. 6 is a schematic representation of a CVT system control configuration that is arranged and configured in accordance with certain features, aspects and advantages of the present invention.
Figure 7:
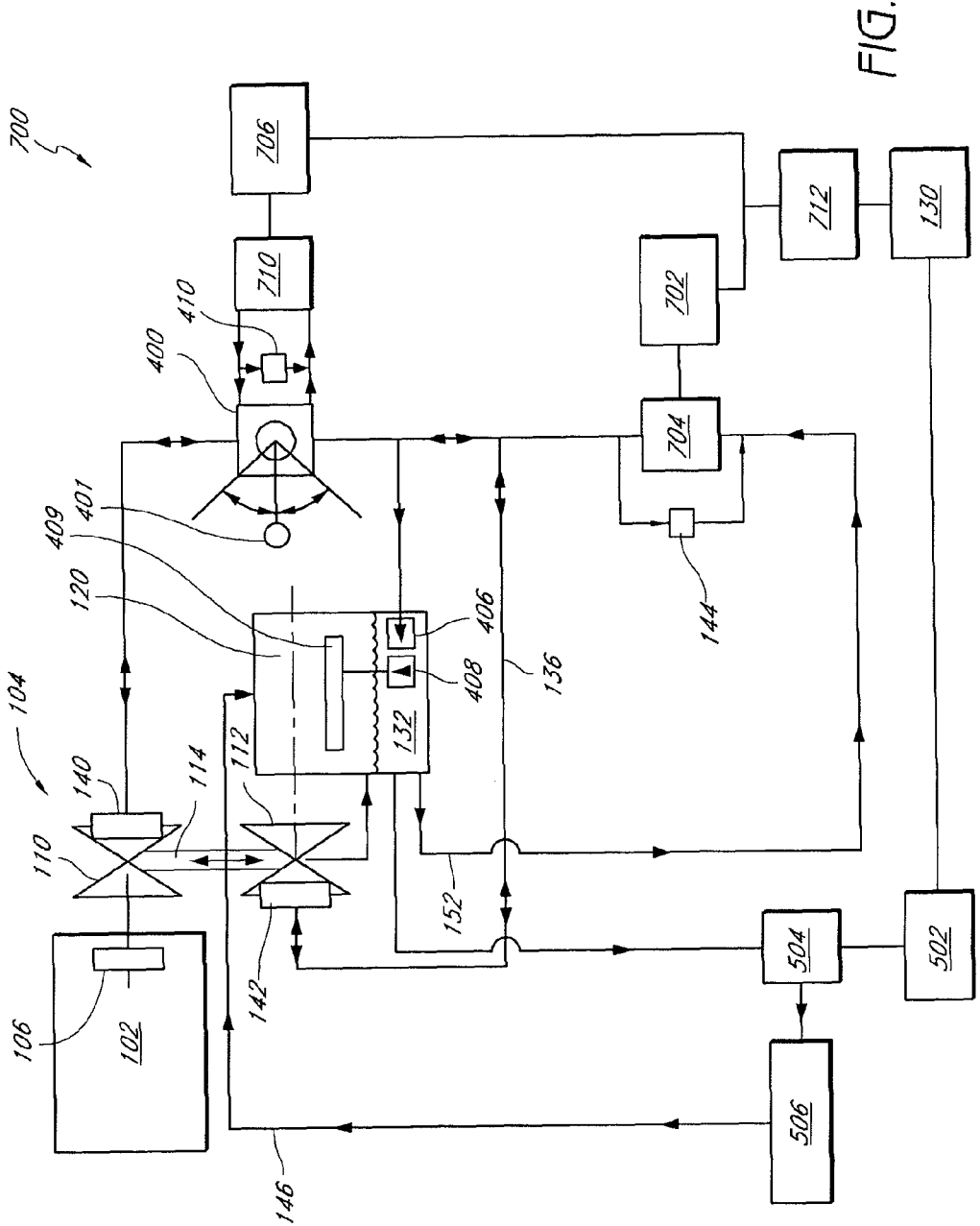
FIG. 7 is a schematic representation of a CVT system control configuration that is arranged and configured in accordance with certain features, aspects and advantages of the present invention.

FIG. 6 illustrates another CVT system control 600 that is arranged and configured in accordance with certain features, aspects and advantages of the present invention and FIG. 7 illustrates a further CVT system control 600 that is arranged and configured in accordance with certain features, aspects and advantages of the present invention. As with the CVT system control 500 described above and shown in FIG. 5, the CVT system controls 600 and 700 provide simplified and preferably substantially electronic free methods of pressurizing and providing variable pressure control of a hydraulic system in a belt or chain drive continuously variable transmission. In the illustrated system controls 600, 700, two separate functions are controlled: chain clamping and cylinder pressure manipulation. The cylinder pressure manipulation changes CVT engine/drive line ratios when fluid passes from in either direction between cylinders. Rather than fully describe the components that remain generally the same between the CVT system control 500 of FIG. 5 and respectively the CVT system control 600 of FIG. 6 and the CVT system control of FIG. 7, the main differences will be described.

The CVT system control 600 of FIG. 6 differs from the CVT system control 500 of FIG. 5 primarily in two regards. First, rather than driving the first and second pumps 124, 126 from a single motor 122 (shown in FIG. 5), the CVT system control 600 of FIG. 6 uses a first motor 602 to drive a first pump 604 and a second motor 606 to drive a second pump 610. Both motors 602, 606 can be powered by the same power source 130.

The first pump 604 can be a variable displacement/variable pressure hydraulic pump of vane or other type, which draws oil from the reservoir 132. The oil is directed under pressure to the passage 136 that connects together the primary and secondary cylinders 140, 142 of the CVT 104, similar to that described above, to establish the clamping force for both sheaves 110, 112 and for other functions. The first pump 604 preferably can vary the output flow and pressure through a pressure modulating actuator 605. In some embodiments, a spring loaded pressure setting can be changed according to the clamping force desired. The bypass relief valve shown in FIG. 1 and FIG. 5 is eliminated in the system 600 of FIG. 6 and is no longer a source of energy loss and heat generation.

The CVT system control 700 of FIG. 7 differs from the CVT system control 500 of FIG. 5 primarily in two regards. First, rather than driving the first and second pumps 124, 126 from a single motor 122 (shown in FIG. 5), the CVT system control 700 of FIG. 7 uses a first motor 702 to drive a first pump 704 and a second motor 706 to drive a second pump 710. Both motors 702, 706 can be powered by the same power source 130 following a conversion to 115 volts AC by a converter 712. Other configurations are possible.

Although the present invention has been disclosed in the context of certain preferred embodiments, examples and variations, it will be understood by those skilled in the art that the present invention extends beyond the specifically disclosed embodiments to other alternative embodiments and/or uses of the invention and obvious modifications and equivalents thereof. For example, in the event of serial production requirements all of the system components can be redesigned/combined etc. for cost effective results. In addition, while a number of variations of the invention have been shown and described in detail, other modifications, which are within the scope of this invention, will be readily apparent to those of skill in the art based upon this disclosure. It is specifically contemplated that various combinations or subcombinations of the specific features and aspects of the embodiments may be made and still fall within the scope of the invention. It should be understood that various features and aspects of the disclosed embodiments can be combined with or substituted for one another in order to form varying modes of the disclosed invention. Moreover, some variations that have been described with respect to one embodiment and not another embodiment can be used with such other embodiments. Many other variations also have been described herein and cross-application is intended where physically possible. Thus, it is intended that the scope of the present invention herein disclosed should not be limited by the particular disclosed embodiments described above, but should be determined only by a fair reading of the claims that follow.

What is claimed is:

1. A transmission and transmission control comprising:
   a continuously variable transmission comprising a first sheave and a second sheave, a flexible member connecting the second sheave to the first sheave such that rotation of the first sheave causes rotation of the second sheave, a continuously variable transmission output shaft being connected to the second sheave;
   a planetary transmission comprising an input shaft, the input shaft of the planetary transmission being connected for rotation with the continuously variable transmission output shaft, the planetary transmission input shaft being connected to a planetary transmission output shaft;
   a motor driving a first pump and a second pump;
   the first pump being fluidly connected to the first sheave and the second sheave, the first pump also being fluidly connected to a pressure relief valve, the pressure relief valve being connected to a flexible member lubrication conduit such that bypass flow from the pressure relief valve can be directed to the flexible member of the continuously variable transmission; and
   the second pump being fluidly connected to a valve, the valve being selectively fluidly connected to the first sheave and the second sheave such that fluid can be supplied through the valve to the first and second sheave to effect ratio changes, the second pump comprising a pump case drain, the pump case drain being fluidly connected to the planetary transmission to supply fluid to gears of the planetary transmission.

2. The transmission and transmission control of claim 1, wherein the first pump draws fluid from a reservoir.

3. The transmission and transmission control of claim 2, wherein the first pump draws fluid from the reservoir through a heat exchanger.

4. The transmission and transmission control of claim 1, wherein the first pump comprises a pump case drain and the pump case drain is fluidly connected to the flexible member lubrication conduit such that fluid from the pump case drain can be directed to the flexible member of the continuously variable transmission.

5. The transmission and transmission control of claim 1, wherein a bypass relief valve is fluidly connected to the second pump, the bypass relief valve selectively bypassing fluid around the valve back to the second pump.

6. The transmission and transmission control of claim 5, wherein the bypass relief valve comprises a knob, the knob being arranged and configured to adjust a pressure level at which bypass flow occurs.

7. The transmission and transmission control of claim 1, wherein the bypass relief valve that is connected to the first pump comprises an inlet passage, the inlet passage being fluidly connected to a bypass passage, a valve seat and a valve member being positioned between the inlet passage and the bypass passage, and the valve member being biased with a biasing force toward the valve seat by a biasing member.

8. The transmission and transmission control of claim 7, wherein the bypass relief valve further comprises an adjustment portion, the adjustment portion altering the biasing force based upon operator engine demand.

9. The transmission and transmission control of claim 8, wherein the adjustment portion comprises a chamber, a diaphragm dividing the chamber into a first portion and a second portion, the first portion being fluidly connected to ambient pressure and the second portion being fluidly connected to an engine intake pressure, the diaphragm being connected to the valve member such that movement of the diaphragm toward the second portion results in increased bypass flow.

10. The transmission and transmission control of claim 8, wherein the adjustment portion comprises an input member, the input member receiving input indicative of increased operator demand on the engine, the input member being connected to the valve member such that increased operator demand on the engine results in decreased bypass flow.

11. The transmission and transmission control of claim 8, wherein the adjustment portion comprises an input member, the input member moving toward the valve seat when operator demand on the engine increases.

12. The transmission and transmission control of claim 11, wherein a bushing is interposed between the input member and the valve member, the bushing transferring forces from the input member to the valve member.

13. The transmission and transmission control of claim 12, wherein a spring is interposed between the input member and the bushing such that force from the input member is transferred to the bushing through the spring.

14. The transmission of claim 11, wherein the adjustment portion comprises a stop, the stop limiting a range of movement of the input member.

15. A transmission and transmission control comprising:
   a continuously variable transmission comprising a first sheave and a second sheave, a flexible member connecting the second sheave to the first sheave such that rotation of the first sheave causes rotation of the second sheave, a continuously variable transmission output shaft being connected to the second sheave;
   a planetary transmission comprising an input shaft, the input shaft of the planetary transmission being connected for rotation with the continuously variable transmission output shaft, the planetary transmission input shaft being connected to a planetary transmission output shaft;
   a first pump supplying fluid to the first sheave and the second sheave such that the first pump creates a base clamping pressure, means for non-electronically modulating pressure according to engine demand being connected to the first pump such that increased operator demand on an engine results in higher clamping pressures being applied to the first and second sheave; and
   a second pump fluidly connected to a valve, the valve selectively supplying fluid to at least one of the first and second sheaves to effect ratio changes between the first and second sheaves.

* * * * *